United States Patent
Lee (10) Patent No.: US 7,116,436 B2
(45) Date of Patent: Oct. 3, 2006

(54) INTELLIGENT ON-LINE FORM PRINTING METHOD AND SYSTEM THEREFOR

(76) Inventor: Jong-Hee Lee, Keung-Nam APT 10-301, Ban-Po 2Dong, Seu-Cho Ku, Seoul (KR)

( * ) Notice: Subject to any disclaimer, the term of this patent is extended or adjusted under 35 U.S.C. 154(b) by 844 days.

(21) Appl. No.: 10/100,340

(22) Filed: Mar. 18, 2002

(65) Prior Publication Data
US 2002/0167685 A1   Nov. 14, 2002

(30) Foreign Application Priority Data
May 10, 2001   (KR)   ............... 2001-0025646

(51) Int. Cl.
*G06F 3/12* (2006.01)
(52) U.S. Cl. ............ 358/1.15; 358/1.18; 347/101
(58) Field of Classification Search ........... 358/1.15, 358/1.18; 347/101
See application file for complete search history.

(56) References Cited

U.S. PATENT DOCUMENTS 6,862,103 B1*   3/2005   Miura et al. ............... 358/1.15

2002/0024686 A1*   2/2002   Uchiyama et al. .......... 358/407
2003/0112306 A1*   6/2003   Simpson et al. ............ 347/101

* cited by examiner

*Primary Examiner*—Kimberly Williams
*Assistant Examiner*—Andrew Lam
(74) *Attorney, Agent, or Firm*—Jackson & Co., LLP (57) ABSTRACT

An intelligent on-line form printing system for combining various forms with various information items and outputting the combination result without an additional printed form and a method therefor are provided. The intelligent on-line form printing system, includes a host computer for controlling the preparation and edition of a form, a user terminal connected to the host computer by wire and by radio, the user terminal for preparing a form and inputting input information, and a printing device connected to the host computer by wire and by radio, the printing apparatus for printing the form. The host computer has a combiner for preparing the form, a converter for converting the combined printing information into a protocol suitable for a printing apparatus, and a printing manager for managing the printing information of the combiner according to a predetermined program and making the printing information statistical data using a printing result.

22 Claims, 6 Drawing Sheets

INTELLIGENT ON-LINE FORM PRINTING METHOD AND SYSTEM THEREFOR

BACKGROUND OF THE INVENTION

1. Field of the Invention

The present invention relates to a method for printing a form and a system therefor, and more particularly, to an intelligent on-line form printing method for preparing and printing a form such as an estimate in real time and a system therefor.

2. Description of the Prior Art

It is common for a person who wishes to purchase a commodity to request the estimate of the commodity he or she wishes to purchase to the provider of the commodity before making a contract for taking out insurance or purchasing a car. Data on the price of a commodity and the term of a contract corresponding to purchase conditions is necessary in order to prepare an estimate. The provider can prepare various estimates that satisfy the conditions desired by the person who wishes to purchase the commodity using the data. The person who wishes to purchase the commodity determines whether to purchase the produce after examining the estimates and reveals his or her intention to purchase the commodity. Accordingly, the contract is made.

In order to prepare an estimate, a provider (a business member, in common) obtains data such as the price of the commodity desired to be purchased and conditions under which the commodity is desired to be purchased (purchase conditions) and calculates the estimated price of the commodity desired to be purchased and the amount to be paid every month using a lap top computer or a palm top computer after consultation with the person who wishes to purchase the commodity.

The lap top computer or the palm top computer has a function of calculating the estimated value of the commodity desired to be purchased or the amount to be paid every month, however, does not have a function of printing the estimate. This is because it is difficult to carry a printer in order to print the estimate. Therefore, unless a business member makes consultation with the person who wishes to purchase the commodity in a business office, the business member cannot provide the estimate to the person who wishes to purchase the commodity the moment the consultation is made in the place where the consultation is made. The person who wishes to purchase the commodity can receive the estimate only after the lapse of few days after the consultation with the business member.

The estimate is made by printing the purchase conditions on a previously printed form. Items on the commodity desired to be purchased are printed in the previously printed estimate form. Blanks for the purchase conditions of the person who wishes to purchase the commodity and the amount to be paid every month remain empty. Therefore, the business member prepares an estimate by inputting the purchase conditions through an estimate preparing system and printing the purchase conditions through a printer which received a previously printed estimate form. Since the previously printed estimate form varies according to the kind of a commodity, when the commodity whose estimate is to be prepared is different from the commodity whose estimate was previously prepared, a different printed estimate form must be provided to the printer.

Printing an estimate by a printer means writing down data in blanks for inputting purchase conditions. When an error, where an estimate form to be printed is wrongly received by the printer, occurs, the purchase conditions (data: numbers, in common) are often printed out of the blanks.

Such misprint deteriorates the quality of an estimate and the customer's interest of the person who wishes to purchase the commodity. As mentioned above, since the business member cannot provide the estimate to the person who wishes to purchase the commodity in the place where the consultation is made, there is not much possibility of making a purchase contract the moment the consultation is made. Also, when a new commodity is developed, a new estimate form must be prepared and printed.

SUMMARY OF THE INVENTION

Accordingly, it is an object of the present invention to provide an intelligent on-line form printing method for printing a form such as the estimate of a commodity desired to be purchased (or contracted) in a place where a consultation with a person who wishes to purchase the commodity is made in an on-line state in real time.

To achieve the above object of the present invention, there is provided: an intelligent on-line form printing system, includes a host computer for controlling the preparation and edition of a form, a user terminal connected to the host computer by wire and by radio, the user terminal for preparing a form and inputting input information, and a printing device connected to the host computer by wire and by radio, the printing apparatus for printing the form.

The host computer includes a combiner for preparing the form, a converter for converting the combined printing information into a protocol suitable for a printing apparatus, and a printing manager for managing the printing information of the combiner according to a predetermined program and making the printing information statistical data using a printing result.

The form preparing unit includes a graph editor for preparing and editing a graph using the input information, a picture editor for preparing and editing pictures and figures, a table editor for preparing and editing tables, a text editor for preparing and editing characters and passages written in the for, a form editor for preparing and editing the form, and a data field editor for preparing and editing a data field for coinciding the input information with the form. The user terminal may be a computer being connected to the host computer by wire, a portable computer, and a mobile telephone.

Meanwhile, an intelligent on-line form printing method, includes the steps of: (a) preparing a form, (b) inputting the purchase conditions of a purchaser and the provision conditions of a provider with respect to a commodity, (c) selecting the form desired to be printed, (d) selecting a method for printing the form, (e) printing the form according to the selected printing method, and (f) storing and managing the contents of the printed form.

The form prepared in the step (a) is recorded in a form database, and the purchase conditions and the provision conditions are input through terminals connected to each other by wire and by wireless in the step (b).

The method of printing the form is one selected from the group consisting of a network printer transmission, a local printer transmission, the Internet transmission, a facsimile transmission, and an e-mail transmission in the step (d), and the form is transmitted to the network printer, the facsimile, and the e-mail in the step (e).

In the step (e), the form is converted into the G3 format when the form is printed by the facsimile and is converted into an Internet specific file when the form is printed by the Internet, when the form is transmitted to the e-mail, the form is converted into an image and is combined with a hyper text markup language (HTML).

The step (e) includes the steps of, receiving the request for printing of the user and storing the request in the printing stand-by database, calling the printing programmed time included in the request for printing and the request for printing corresponding to the order of priority from the printing stand-by database, analyzing the request for printing, converting the request into an actual value that can be confirmed by an actual purchaser, and generating actual data, combining the actual data with the form and generating a printed form, and searching the kinds of printing devices included in the header of the request for printing and transmitting the printed form to a printing device corresponding to the request for printing.

The printing method is one selected from the group consisting of printing by a network printer, printing by a facsimile, and an e-mail transmission, and in the step (f), errors during the network printer transmission, the facsimile transmission, and the e-mail transmission are examined, the errors are recorded in a printing log database, and, after the printed form is printed, the contents of the printed form are recorded in the printing log database.

The method for printing an intelligent on-line form according to the present invention is made a program and is recorded in recording media such as a compact disc (CD), a digital versatile disc (DVD), a magnetic disc, and a magnetic tape.

According to the present invention, it is possible to print a form such as an estimate in various types in an on-line state and in real time using paper without preparing an additional printed form.

Also, since it is possible to print the estimate in the form of an electronic document such as a hyper text markup language (HTML), it is possible to print the form in real time regardless of a place.

BRIEF DESCRIPTION OF THE DRAWINGS

The above objects and other advantages of the present invention will become more apparent by describing preferred embodiments thereof in detail with reference to the attached drawings in which.

DETAILED DESCRIPTION OF THE PREFERRED EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 1:
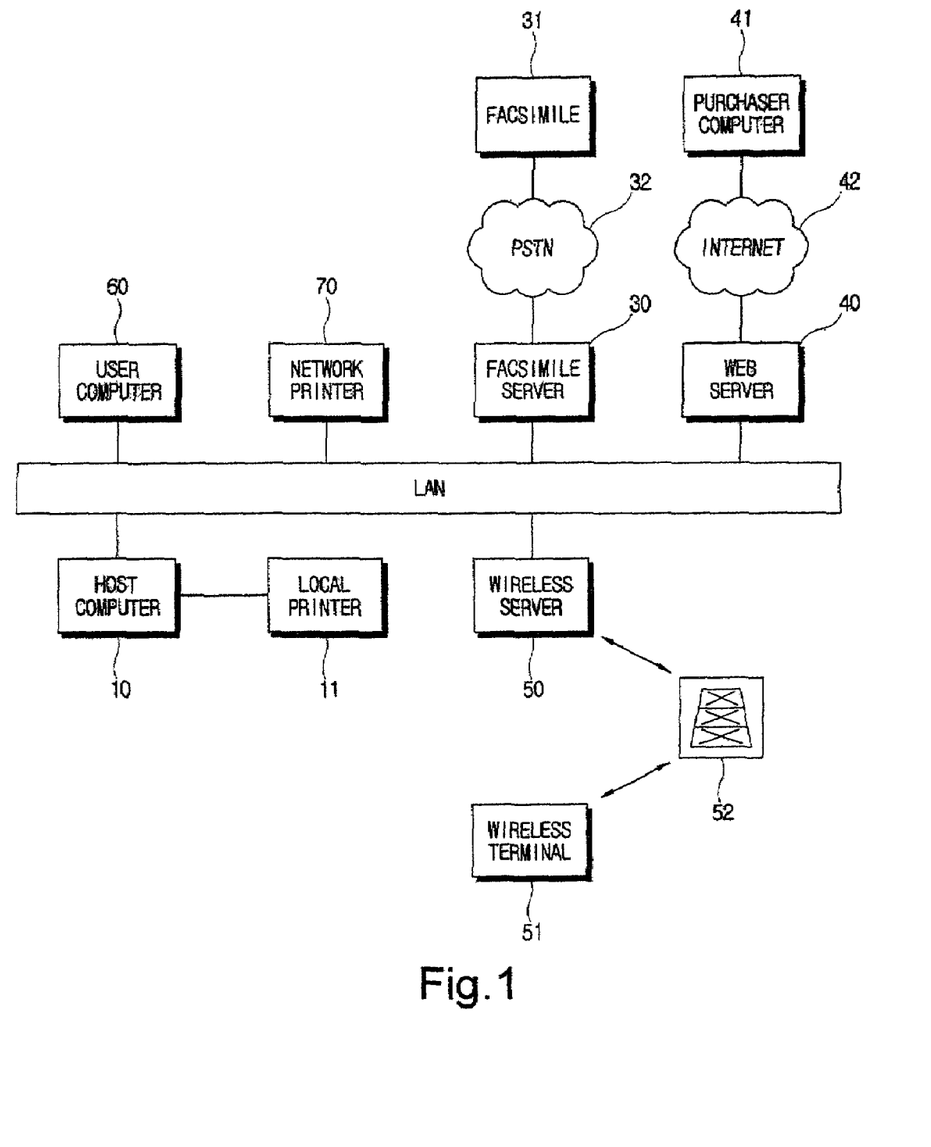
FIG. 1 is a block diagram showing an intelligent on-line form printing system according to the present invention.

FIG. 1 schematically shows an intelligent on-line estimate system according to a preferred embodiment of the present invention. A host computer 10, a network printer 70, a facsimile server 30, a web server 40, a wireless server 50, and a user computer (or a terminal) 60 are connected to each other through a local area network (LAN). Only one network printer 70 is shown in FIG. 1. However, the number of network printers can increase according to the printing amount of a form when the network printer 70 is actually used.

A local printer 11 is connected to the host computer 10 through the parallel port of the host computer 10. The facsimile server 30 is connected to a facsimile 31 of a person who wishes to purchase a commodity (a purchaser) through a public switched telephone network (PSTN) 32. The web server 40 is connected to a computer 41 of the purchaser through the Internet 42.

The wireless server 50 is connected to a wireless terminal 51 carried by business members so that data communications can be performed through a wireless base station 52. The wireless terminal 51 includes a personal digital assistance (PDA) loaded with programs of introduction for and an estimate of the commodity of an enterprise to which a business member belongs (a provider), a mobile phone that has the functions of the wireless Internet, and a palm top computer. A lap top computer (a notebook computer) can perform data communications with the host computer 10 or the wireless server 50 through a telephone (a wired or wireless telephone) or the Internet. The lap top computer is classified as the wireless terminal 51 in the case of connecting to the Internet using the mobile phone and has a similar function to the function of the purchaser computer 41 in the case of connecting to the Internet using a network adapter such as a wired modem or a LAN card.

Figure 2:
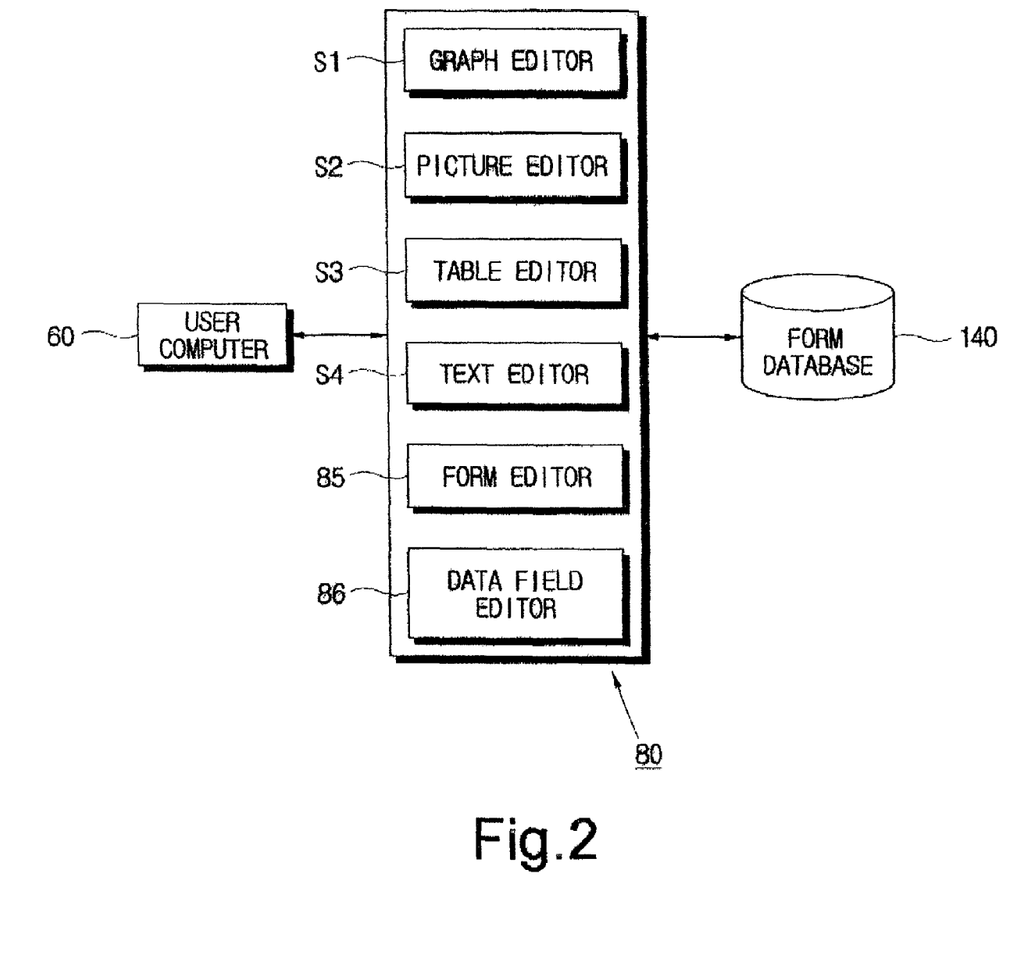
FIG. 2 is a schematic diagram showing a form preparing unit built in the host of FIG. 1, for preparing and editing a form.
Figure 3:
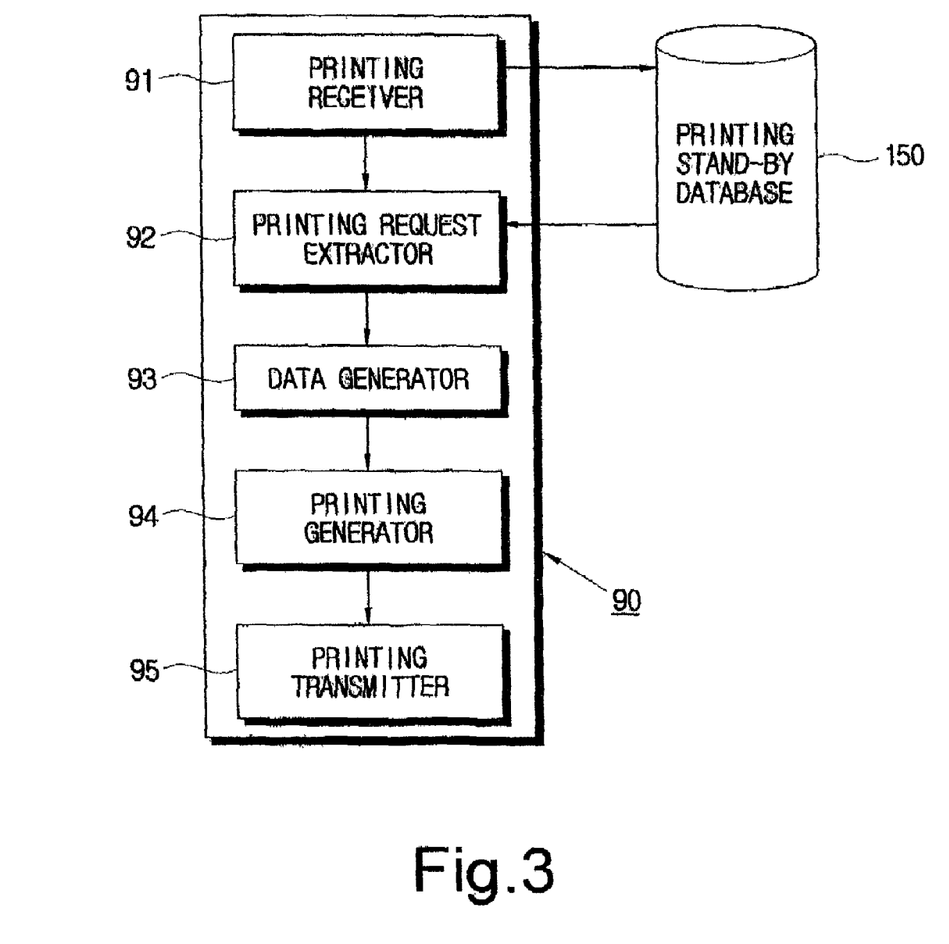
FIG. 3 is a schematic diagram showing a combiner built in the host of FIG. 1, for printing a form according to the request of a user.
Figure 4:
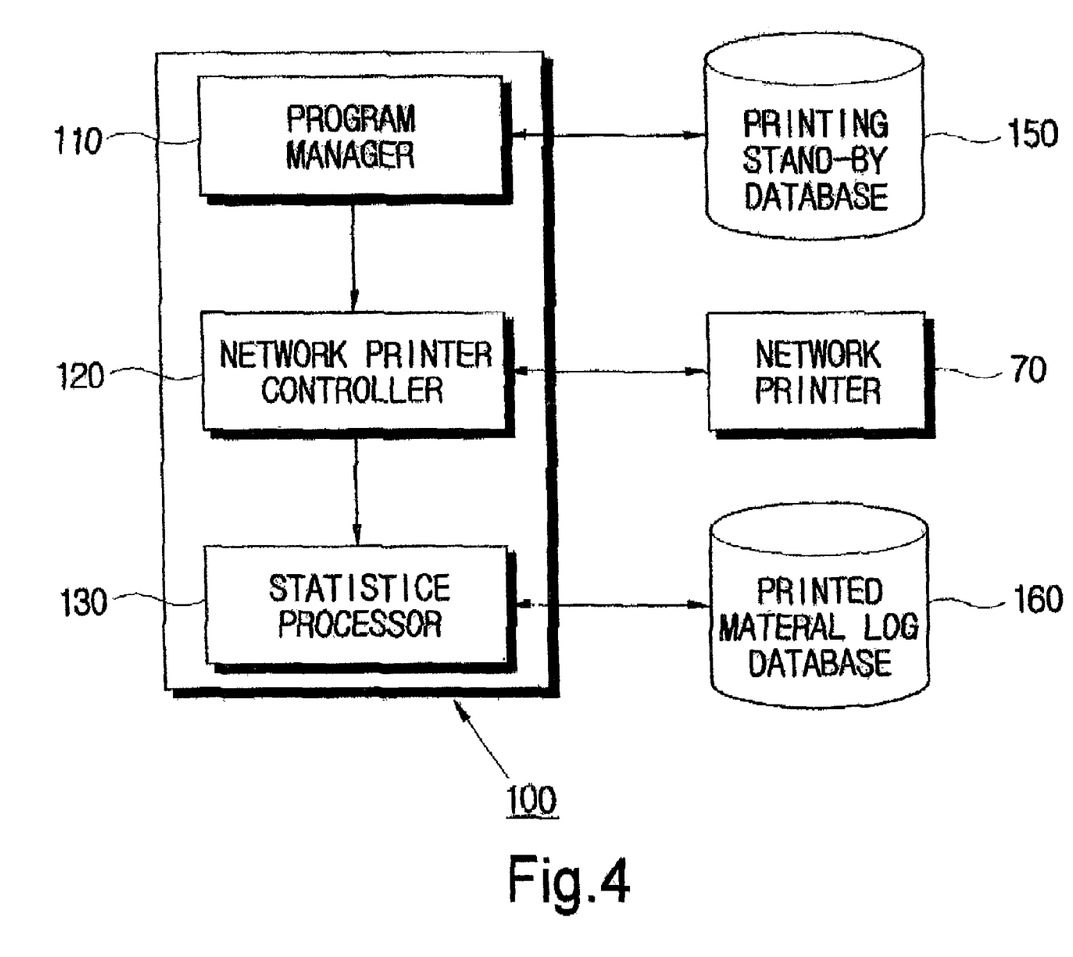
FIG. 4 is a schematic diagram showing a printing controller for controlling the printing of forms requested by users according to a predetermined schedule.

The host computer 10 includes a form preparing unit 80 for preparing and editing forms such as various estimates of the commodity of the provider, which the purchaser wishes to purchase, a combiner 90 for combining data on the personal items of the purchaser and purchase conditions and the formed prepared by the form preparing unit 80 and generating printed information, and a printing manager 100 for managing the printed information of the combiner 90 according to a predetermined schedule and making the printed information statistical data using the printed result, as shown in FIGS. 2 through 4.

Referring to FIG. 2, the form preparing unit 80 includes a graph editor 81 for preparing and editing various graphs, by which it is possible to generate graphs using purchase data input by the user, a picture editor 82 for preparing and editing pictures and figures in the form of JPG, BMP, GIF, and TIFF that decorate the form, a table editor 83 for preparing and editing a table that contains the purchase conditions and estimate of the purchaser, a text editor 84 for preparing and editing various characteristics and passages mentioned in the form, a form editor 85 for preparing and editing the form, and a data field editor 86 for preparing and editing a data field that coincides the purchase conditions and the provision conditions of a provider with the blanks of the form. A user (or a developer) can prepare and edit a form through a computer 60 and can select the form through the user terminal 51.

The form preparing unit 80 stores the form prepared and edited by the user in a form database 140. The form is extracted by the call of the combiner 90 and is combined with the purchase conditions of the purchaser and the provision conditions, which are input by the user.

The combiner 90 includes a printing receiver 91 for receiving the request for printing a form of a user and recording the request for printing in a printing stand-by database 150, a printing request extractor 92 for calling a printing programmed time included in the request for printing and the request for printing corresponding to the order of priority from the printing stand-by database 150, a data generator 93 for generating real data for analyzing the request for printing and converting the request for printing into an actual value that can be confirmed by an actual purchaser, a printing generator 94 for combining the actual data with the form prepared by the form preparing unit 80 and generating a formed to be actually printed, and a printing transmitter 95 for searching printing apparatuses such as the network printer 70 included in the header of the request for printing, the facsimile 31, and the e-mail address of the purchaser and transmitting printing data to the printing apparatus corresponding to the request for printing.

The printing receiver 91 receives the purchase conditions and provision conditions input through the user computer 60 or the wireless terminal 51, the form selected by the user, and data on the printing apparatus by which the user desires to print the form, the order of priority of printing, and the printing time. Information on the printing apparatus is included in the header of the data on the request for printing. The printing receiver 91 changes the data on the request for printing received from the user computer 60 or the wireless terminal 51 into a printing program, makes the printing program a database, and records the database in the printing stand-by database 150.

The printing request extractor 92 calls the request for printing of the user from the printing stand-by database 150 whose printing time has come according to the printing program.

The request for printing extracted from the printing stand-by database 150 is converted into an actual value by the data generator 93. The data generator 93 analyses the request for printing and converts the data input by the user into an actual value that can be confirmed by the actual purchaser.

The printing generator 94 combines the form with the actual value and generates a completed form obtained by writing down the purchase conditions and provision conditions in the blanks of the form that is additionally printed. By doing so, it is possible to print an estimate using empty paper unlike a conventional system for printing forms.

In order to combine the form with the actual value, the blanks of the form must coincide with the respective items of the purchase conditions and provision conditions that are converted into actual values. This is performed by the data field editor 86 of the form preparing unit 80. Therefore, although the screen to which the user inputs the purchase conditions and provision conditions is different from the above form, the input purchase conditions and provision conditions do not deviate from the blanks of the form.

The form to be printed, which is obtained by combining the actual value with the form is transmitted to the network printer 70, the facsimile server 30, and the web server 40 by the printing transmitter 95 according to the printing apparatuses included in the request for printing.

The printing transmitter 95 analyses the header of the request for printing and detects through which printing apparatus a user desires to print the form. When the printing apparatus through which the form is to be printed is the network printer 70, the form to be printed, which is obtained by combining the actual value with the form, is transmitted to the network printer 70 and is finally printed. The contents of the form, which are output to the network printer 70, are stored in a printed material log database 160. The contents include the kind of the commodity, the name of the user, the kind of the form, and the date. The printed material log database 160 can be used as various statistical data for mapping out the business strategy of the provider and improving the business performance of the user.

When the printing apparatus by which the form will be printed is the facsimile 31 of the purchaser, the form to be printed is transmitted to the facsimile server 30 by the printing transmitter 95. The facsimile server 30 transmits the form to be printed to the facsimile number of the purchaser input by the user. When the form to be printed is received from the printing transmitter 95, the facsimile server 30 converts the form to be printed into the G3 format and dials the facsimile number of the purchaser, which is included in the request for printing of the user, which is input by the user. When the facsimile 31 of the purchaser is dialed, the facsimile server 30 transmits the form converted into the G3 format. When an error such as the interruption of communication occurs during the transmission of the form, the error is recorded in the printed material log database 160. The facsimile transmission is completed without errors, the facsimile server 30 stores the contents of the facsimile transmitted form in the printed material log database 160.

When the printing apparatus by which the form is to be printed is the e-mail of the purchaser, the form to be printed is transmitted to the web server 40 by the printing transmitter 95. The web server 40 transmits the form to be printed to the e-mail address of the purchaser, which is input by the user. When the web server 40 receives the form to be printed from the printing transmitter 95, the form to be printed is converted into an image, is combined with a hyper text markup language (HTML), and is transmitted to the e-mail address of the purchaser or the user. When the e-mail address of the purchaser or the user is an e-mail address on the wireless Internet, the form to be printed is transmitted to the e-mail address of the purchaser or the user by the wireless server 50. When errors such as the interruption of communication, the returning of the transmitted form, and the absence of a receiver (a purchaser or a user) occur during the transmission of the form, the errors are recorded in the printed material log database 160. When the e-mail transmission is completed without errors, the web server 40 stores the contents of the e-mail transmitted form in the printed material log database 160. At this time, the e-mail address of the receiver can be stored in the printed material log database 160.

The printing manager 100 transmits the request for printing to the printing request extractor 92 according to the request of the printing request extractor 92 of the combiner 90 and includes a program manager 110 for managing the printing program, a network printer controller 120 for controlling the network printer 70 for the successful printing of the form to be printed, and a statistics processor 130 for analyzing the contents of the form, which are recorded in the printed material log database 160, and preparing a statistical material.

The program manager 110 manages the printing stand-by database 150 recorded by the printing receiver 91 of the combiner 90. The program manager 110 manages the request for printing recorded in the printing stand-by database 150 such as the change in the order of priority of printing, the cancellation of the request for printing, and the programmed printing time by the request of a user. When the request for printing corresponding to the printing program that coincides with the data requested by the printing request extractor 92 is transmitted to the printing request extractor 92 corresponding to the call of the printing request extractor 92, the program manager 110 deletes the request for printing from the printing stand-by database 150. The request for printing that is behind in the order of priority than the deleted request for printing is managed in the printing stand-by state. When the call of the data of the printing request extractor 92 is requested, the data is firstly transmitted.

When the form to be printed is transmitted to the network printer 70 by the printing transmitter 95 of the combiner 90, the network printer controller 120 controls the network printer 70. The network printer controller 120 checks the state of the network printer 70, that is power on/off, no-paper, paper jam, on-line, and off-line. When the form to be printed cannot be printed due to errors such as line-off, no paper, and paper jam in the network printer 70, the errors are recorded in the printed material log database 160 and all of the printings are deferred. When the form to be printed is printed after the errors of the network printer 70 are solved or the form is printed without the errors, the contents of the printed form are recorded in the printed material log database 160 together with the errors.

The statistics processor 130 prepares and prints statistical data for improving the business strategy of a provider and the business performance of a business member from the printed material log database 160, in which the contents of the network printer 70, the facsimile printing by the facsimile server 30, and the e-mail transmission by the web server 40 are recorded, when the statistical data are requested by a system manager.

A method for printing an intelligent on-line form according to a preferred embodiment of the present invention will be described with reference to FIGS. 5 and 6.

Figure 5:
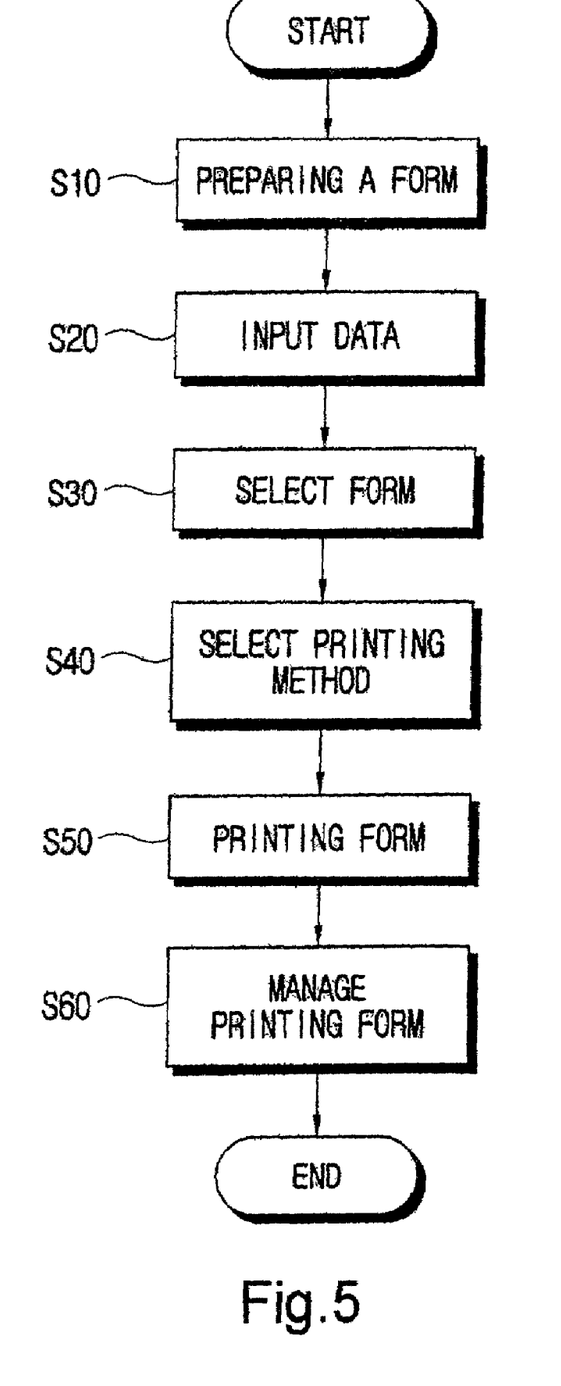
FIG. 5 is a flowchart illustrating an intelligent on-line form printing method according to the present invention.
Figure 6:
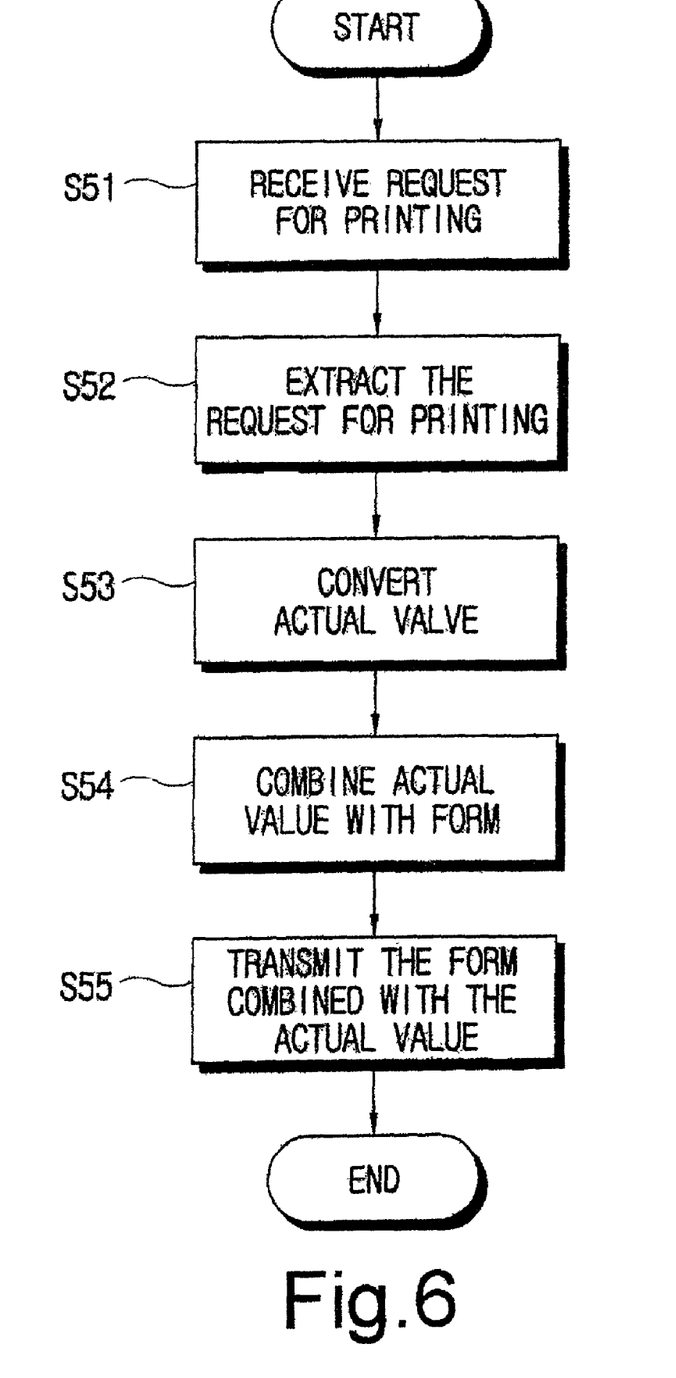
FIG. 6 is a flowchart illustrating the printing step of FIG. 5 in detail.

FIG. 5 is a flowchart illustrating a method for printing an intelligent on-line form according to the present invention. As shown in FIG. 5, the method for printing an intelligent on-line form includes a step of preparing a form (S10), a step of inputting the purchase conditions a purchaser and the provision conditions of a provider with respect to a commodity (S20), a step of selecting the form desired to be printed (S30), a step of selecting a method of printing the form (S40), a step of printing the form by a printer, a facsimile, or an e-mail according to the selected printing method (S50), and a step of storing and managing the contents of the printed form (S60).

A user prepares a predetermined form in an on-line state by the user computer 60 using the form preparing unit 80 in the step S10. The form is prepared and edited using pictures, tables, graphs, and characteristics as mentioned above. The prepared form is recorded as a record in the form database 140 stored in the host computer 10.

The user inputs the purchase conditions and the provision conditions through the user computer 60 or the wireless terminal 51, which is connected to a system for printing an intelligent on-line form according to the preferred embodiment of the present invention in order to input the personal items of the purchaser (S20).

When the purchase conditions and the provision conditions are input by the user and the form is selected (S30), the user selects the printing method of the form (S40). The printing method of the form includes printing using the network printer 70, printing, in which the form is transmitted to the facsimile 31 of the purchaser or the user by wire or by radio, and Internet printing, in which the form is transmitted to the e-mail address of the user or the purchaser. The user selects the printing method and commands the form to be printed through the user computer 60 or the user terminal 51.

When the purchase conditions and the provision conditions are input by the user and the form is selected (S30), the user selects the printing method of the form (S40). The printing method of the form includes printing using the network printer 20, printing, in which the form is transmitted to the facsimile 31 of the purchaser or the user by wire or by radio, and Internet printing, in which the form is transmitted to the e-mail address of the user or the purchaser. The user selects the printing method and commands the form to be printed through the user computer 60 or the wireless terminal 51.

The step S50 is controlled by the combiner 90 and includes a step of receiving the request for printing of the user and storing the request in the printing stand-by database 150 (S51), a step of calling the printing programmed time included in the request for printing and the request for printing corresponding to the order of priority from the printing stand-by database 150 (S52), a step of analyzing the called request for printing and generating actual data for converting the request for printing into an actual value that can be confirmed by an actual purchaser (S53), a step of combining the actual data with the form prepared by the form preparing unit 80 and generating a form to be actually printed (S54), and a step of searching printing apparatuses such as the e-mail address of the purchaser and transmitting printing data to the printing apparatus corresponding to the request for printing (S55).

In the step S51, the purchase conditions and the provision conditions that are input through the user computer 60 or the wireless terminal 51, the form selected by the user, and data on the printing apparatus by which the user wishes to print the form, the order of priority of printing, and the printing time. Information on the printing apparatus is included in the header of the printing request data. The printing receiver 91 changes the printing request data received from the user computer 60 or the wireless terminal 51 into a printing program, makes the printing program a database, and records the database in the printing stand-by database 150.

In the step S52, the printing request of the user is called or extracted from the printing stand-by database 150 whose printing time has come according to the printing program.

In the step S53, the printing request extracted from the printing stand-by database 150 is converted into an actual value by the data generator 93. The printing request is analyzed by the data generator 93 and is converted into an actual value, by which the data input by the user can be confirmed by the actual purchaser.

In the step S54, the form is combined with the actual value by the printing generator 94 and a completed form obtained by writing down the purchase conditions and the provision conditions in the blanks of the additionally printed form.

In the step S55, the header of the printing request is analyzed by the combiner 90 and the printing apparatus requested by the user is detected. The form to be printed, which is obtained by combining the actual value with the form, is transmitted to the network printer 70, the facsimile server 30, and the web server 40, which are the printing apparatuses detected by the printing transmitter 95.

In the step S60, when the user wishes to print the form through the network printer 70, the printing manager 100 examines the state of the network printer 70. The state of the network printer 70 includes power on/off, no paper, paper jam, line on/off, and the request for printing in a printing stand-by state.

The printing manager 100 examines the network printer state and prints the request for printing of the user by transmitting the request for printing, that is, the form to be printed to the network printer 70. When the form is printed, the printing manager 100 records the contents of the request for printing, which is printed, in the printing log database 160.

When the form is printed by the facsimile 31 of the purchaser, the form to be printed is transmitted to the facsimile server 30 together with the number of the facsimile 31 of the purchaser. The facsimile server 30 converts the form into the G3 format and transmits the G3 format to the facsimile of the purchaser.

When the error such as the interruption of communication occurs during the transmission of the form, the error is recorded in the printed material log database 160. When the facsimile transmission is completed, the contents of the transmitted form are stored in the printed material log database 160.

When the form is printed by the e-mail of the purchaser, the form to be printed is transmitted to the e-mail address of the purchaser (or the user) through the web server 40 by the printing transmitter 95. The form to be printed is converted into an image, is combined with the HTML, and is transmitted to the e-mail address of the purchaser (or the user). When the e-mail address is the e-mail address on the wireless Internet, the form to be printed is transmitted to the e-mail address of the purchaser (or the user) by the wireless server 50.

When errors such as the interruption of communication, the returning of the transmitted form, and no e-mail of the receiver (the purchaser or the user) occur during the e-mail transmission of the form, the errors are recorded in the printed material log database 160. When the e-mail transmission is completed, the contents of the form are stored in the printed material log database 160 together with the e-mail address of the receiver.

In the step S60, when the system manager (or the user) requests statistical data by the statistics processor 130, the statistical data for improving the business strategy of the provider and the business performance of the business member are prepared and printed from the printed material log database 160, in which the contents of the facsimile printing by the network printer 70 and the facsimile server 30 and the e-mail transmission by the web server 40 are recorded.

The method for printing an intelligent on-line form is prepared as a program, is recorded in recording media such as a compact disc (CD), a digital versatile disc (DVD), a magnetic disc, and a magnetic tape and is driven by being loaded in a memory by various program calling apparatuses.

As mentioned above with reference to a preferred embodiment of the present invention, according to the system for printing an intelligent on-line form and a method therefor of the present invention, it is possible to print forms such as an estimate in an on-line state in various forms using empty paper without preparing an additional printed form.

Since the form can be also printed in the form of an electronic document such as a hyper text markup language (HTML) not only in paper printing and can be printed by a facsimile, the form can be printed in real time regardless of a place.

It is possible to use the performance of a business member and the commodity preferred by a purchaser, which are obtained by investigating the contents of the printed form, as management information.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An intelligent on-line form printing system, comprising:
   a host computer for controlling the preparation and edition of a form;
   a user terminal connected to the host computer by wire and by radio, the user terminal for preparing a form and inputting input information; and
   a printing device connected to the host computer by wire and by radio, the printing apparatus for printing the form;
   wherein the host computer comprises:
      a combiner for preparing the form;
      a converter for converting the combined printing information into a protocol suitable for a printing apparatus; and
      a printing manager for managing the printing information of the combiner according to a predetermined program and making the printing information statistical data using a printing result;
   wherein the combiner comprises:
      a printing receiver for receiving the printing information and recording the printing information in a printing stand-by database;
      a printing request extractor for calling the printing programmed time included in the printing information and the printing request corresponding to the order of priority from the printing stand-by database;
      a data generator for analyzing the printing information, converting the printing information into an actual value, and generating actual data;
      a printing combiner for combining the actual data with the formed prepared by the form preparing unit, and combining a form to be printed; and
      a printing and conversion transmitter for analyzing the header of the printing information, converting the form to be printed, and transmitting the form to the printing device.

2. The system of claim 1, wherein the printing device comprises a network printer connected to the host computer by wire, a local printer, the Internet, a facsimile server for transmitting the form to be printed by a facsimile, and a web server for transmitting the form to be printed to an e-mail address.

3. The system of claim 2, wherein the facsimile server converts the form to be printed into the G3 format and transmits the G3 format to the facsimile.

4. The system of claim 2, wherein the web server converts the form to be printed into an image, combines the image with a hyper text markup language (HTML), and transmits the combined result.

5. The system of claim 1, wherein the form preparing unit comprises:
   a graph editor for preparing and editing a graph using the input information;
   a picture editor for preparing and editing pictures and figures;
   a table editor for preparing and editing tables;
   a text editor for preparing and editing characteristics and passages written in the form;
   a form editor for preparing and editing the form; and a data field editor for preparing and editing a data field for coinciding the input information with the form.

6. The system of claim 1, wherein the user terminal is connected to the host computer by wire.

7. The system of claim 1, wherein the user terminal comprises at least one of a portable computer, a mobile telephone, or combinations thereof.

8. An intelligent on-line form printing system, comprising:
   a host computer for controlling the preparation and edition of a form;
   a user terminal connected to the host computer by wire and by radio, the user terminal for preparing a form and inputting input information; and
   a printing device connected to the host computer by wire and by radio, the printing apparatus for printing the form;
   wherein the host computer comprises:
      a combiner for preparing the form;
      a converter for converting the combined printing information into a protocol suitable for a printing apparatus; and
      a printing manager for managing the printing information of the combiner according to a predetermined program and making the printing information statistical data using a printing result;
   wherein the printing manager comprises:
      a program manager for transmitting the printing information to the combiner according to the request of the combiner and managing a printing program;
      a network printer controller for controlling a network printer connected to the host computer by wire; and
      a statistics processor for analyzing the contents of the form using a printed material log database, in which the contents of the printed form are recorded, and preparing statistical data.

9. The system of claim 8, wherein the network printer controller examines the states of the network printer such as power on/off, no paper, paper jam, on line, and off line,
   wherein, when the form to be printed cannot be output to the network printer due to the errors such as line off, no paper, and paper jam, the network printer controller records the error in the printed material log database and defers all of the printings until the errors are solved, and
   wherein, when the form is printed without the errors, the network printer controller records the contents of the printed form in the printed material log database.

10. The system of claim 8, wherein the form preparing unit comprises:
   a graph editor for preparing and editing a graph using the input information;
   a picture editor for preparing and editing pictures and figures;
   a table editor for preparing and editing tables;
   a text editor for preparing and editing characteristics and passages written in the form;
   a form editor for preparing and editing the form; and
   a data field editor for preparing and editing a data field for coinciding the input information with the form.

11. The system of claim 8, wherein the user terminal is connected to the host computer by wire.

12. The system of claim 8, wherein the user terminal comprises at least one of a portable computer, a mobile telephone, or combinations thereof.

13. An intelligent on-line form printing method, comprising the steps of: (a) preparing a form; (b) inputting the purchase conditions of a purchaser and the provision conditions of a provider with respect to a commodity; (c) selecting the form desired to be printed; (d) selecting a method for printing the form; (e) printing the form according to the selected printing method; and (f) storing and managing the contents of the printed form; wherein the method of printing the form is one selected from the group consisting of a network printer transmission, a local printer transmission, the Internet transmission, a facsimile transmission, and an e-mail transmission in the step (d), and wherein the form is transmitted to one of the network printer, the facsimile, and the e-mail in the step (e); wherein, in the step (e), when the form is transmitted to the e-mail, the form is converted into an image and is combined with a hyper text markup language (HTML).

14. The method of claim 13, wherein the form prepared in the step (a) is recorded in a form database.

15. The method of claim 13, wherein the purchase conditions and the provision conditions are input through terminals connected to each other by wire and by wireless in the step (b).

16. The method of claim 13, wherein the printing method is one selected from the group consisting of printing by a network printer, printing by a facsimile, and an e-mail transmission, and
   wherein, in the step (f), errors during the network printer transmission, the facsimile transmission, and the e-mail transmission are examined, the errors are recorded in a printing log database, and, after the printed form is printed, the contents of the printed form are recorded in the printing log database.

17. An intelligent on-line form printing method, comprising the steps of:
   (a) preparing a form;
   (b) inputting the purchase conditions of a purchaser and the provision conditions of a provider with respect to a commodity;
   (c) selecting the form desired to be printed;
   (d) selecting a method for printing the form;
   (e) printing the form according to the selected printing method; and
   (f) storing and managing the contents of the printed form;
   wherein the step (e) comprises the steps of:
      receiving the request for printing of the user and storing the request in the printing stand-by database;
      calling the printing programmed time included in the request for printing and the request for printing corresponding to the order of priority from the printing stand-by database;
      analyzing the request for printing, converting the request into an actual value that can be confirmed by an actual purchaser, and generating actual data;
      combining the actual data with the form and generating a printed form; and
      searching the kinds of printing devices included in the header of the request for printing and transmitting the printed form to a printing device corresponding to the request for printing.

18. The method of claim 17, wherein the form prepared in the step (a) is recorded in a form database.

19. The method of claim 17, wherein the purchase conditions and the provision conditions are input through terminals connected to each other by wire and by wireless in the step (b).

20. The method of claim 17, wherein the method of printing the form is one selected from the group consisting of a network printer transmission, a local printer transmission, the Internet transmission, a facsimile transmission, and an e-mail transmission in the step (d), and wherein the form is transmitted to the network printer, the facsimile, and the e-mail in the step (e).

21. The method of claim 20, wherein, in the step (e), the form is converted into the G3 format when the form is printed by the facsimile and is converted into an Internet specific file when the form is printed by the Internet.

22. The method of claim 17, wherein the printing method is one selected from the group consisting of printing by a network printer, printing by a facsimile, and an e-mail transmission, and wherein, in the step (f), errors during the network printer transmission, the facsimile transmission, and the e-mail transmission are examined, the errors are recorded in a printing log database, and, after the printed form is printed, the contents of the printed form are recorded in the printing log database.

* * * * *